(12) United States Patent
Verma et al.

(10) Patent No.: US 11,967,268 B1
(45) Date of Patent: Apr. 23, 2024

(54) SYSTEMS AND METHODS OF SECURE IMAGING

(71) Applicant: QUALCOMM Incorporated, San Diego, CA (US)

(72) Inventors: Nikhil Verma, Bangalore (IN); Prakasha Nayak, Parkala (IN); Vishnu Vardhan Kasilya Sudarsan, Bangalore (IN); Avinash Shrivastava, Hyderabad (IN); Balamukund Sripada, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/053,109

(22) Filed: Nov. 7, 2022

(51) Int. Cl.
| | |
|---|---|
| G09G 3/22 | (2006.01) |
| G06F 3/14 | (2006.01) |
| G06T 5/50 | (2006.01) |
| G06T 9/00 | (2006.01) |
| G06V 10/70 | (2022.01) |
| G02B 27/01 | (2006.01) |

(52) U.S. Cl.
CPC ............... *G09G 3/22* (2013.01); *G06F 3/14* (2013.01); *G06T 5/50* (2013.01); *G06T 9/00* (2013.01); *G06V 10/70* (2022.01); *G02B 2027/0138* (2013.01); *G06T 2207/20224* (2013.01); *G06V 2201/07* (2022.01)

(58) Field of Classification Search
CPC ...... G09G 3/22; G06V 10/70; G06V 2201/07; G06F 3/14; G06T 5/50; G06T 9/00; G06T 2207/20224; G02B 2027/0138

USPC .......................................................... 345/84
See application file for complete search history.

(56) References Cited

U.S. PATENT DOCUMENTS

| | | | |
|---|---|---|---|
| 8,515,128 B1* | 8/2013 | Hildreth | G06F 3/0421 |
| | | | 382/103 |
| 9,558,540 B2* | 1/2017 | Mukawa | G06F 18/22 |
| 9,767,728 B2* | 9/2017 | Evans, V | G02B 27/0093 |
| 9,955,150 B2* | 4/2018 | Gulati | H04N 17/004 |
| 11,307,412 B1* | 4/2022 | Meisenholder | G02B 27/0101 |
| 2011/0019056 A1* | 1/2011 | Hirsch | H04N 5/2226 |
| | | | 348/333.01 |
| 2017/0092220 A1* | 3/2017 | Mullins | G09G 5/003 |
| 2017/0352128 A1* | 12/2017 | Sasao | G06T 5/003 |
| 2018/0054602 A1* | 2/2018 | Ouchi | G06T 5/006 |
| 2020/0292825 A1* | 9/2020 | Grundhoefer | G02B 27/0179 |
| 2021/0103143 A1* | 4/2021 | Chang | G01B 11/22 |
| 2022/0207674 A1* | 6/2022 | Pincenti | H04N 23/80 |
| 2022/0318971 A1* | 10/2022 | Choi | G06T 5/50 |

* cited by examiner

*Primary Examiner* — Tom V Sheng
(74) *Attorney, Agent, or Firm* — QUALCOMM Incorporated

(57) ABSTRACT

Imaging systems and techniques are described. An imaging system causes a display to display light according to a predefined pattern. The imaging system receives image data of a scene from an image sensor. The image data is captured using the image sensor while the display is configured to display the light according to the predefined pattern. The imaging system processes the image data to generate at least one image frame of the scene based on detection of the predefined pattern in the image data. The imaging system outputs the at least one image frame of the scene.

30 Claims, 9 Drawing Sheets

US 11,967,268 B1

SYSTEMS AND METHODS OF SECURE IMAGING

FIELD

This application is related to image capture and processing. More specifically, this application relates to systems and methods of using image data from an image sensor to detect a light pattern displayed using a display adjacent to the image sensor to provide security for a device that includes the display and the image sensor.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Some devices can analyze image data captured by an image sensor to detect an object within the image data.

BRIEF SUMMARY

In some examples, systems and techniques are described for imaging. An imaging system causes a display to display light according to a predefined pattern. The imaging system receives image data of a scene from an image sensor. The image data is captured using the image sensor while the display is configured to display the light according to the predefined pattern. The imaging system processes the image data to generate at least one image frame of the scene based on detection of the predefined pattern in the image data. The imaging system outputs the at least one image frame of the scene.

According to at least one example, an apparatus for imaging is provided that includes at least one memory and at least one processor (e.g., implemented in circuitry) coupled to the at least one memory. The at least one processor is configured to and can: cause a display to display light according to a predefined pattern; receive image data of a scene from an image sensor, the image data captured using the image sensor while the display is configured to display the light according to the predefined pattern; detect the predefined pattern within the image data; and process, in response to detection of the predefined pattern within the image data, the image data to generate at least one image frame of the scene; and output the at least one image frame of the scene.

In another example, a method is provided for imaging. The method includes: causing a display to display light according to a predefined pattern; receiving image data of a scene from an image sensor, the image data captured using the image sensor while the display is configured to display the light according to the predefined pattern; detecting the predefined pattern within the image data; and processing, in response to detection of the predefined pattern within the image data, the image data to generate at least one image frame of the scene; and outputting the at least one image frame of the scene.

In another example, a non-transitory computer readable storage medium is provided that has stored thereon instructions that, when executed by least one processor, cause the at least one processor to: cause a display to display light according to a predefined pattern; receive image data of a scene from an image sensor, the image data captured using the image sensor while the display is configured to display the light according to the predefined pattern; detect the predefined pattern within the image data; and process, in response to detection of the predefined pattern within the image data, the image data to generate at least one image frame of the scene; and output the at least one image frame of the scene.

In another example, an apparatus for imaging is provided. The apparatus includes: means for causing a display to display light according to a predefined pattern; means for receiving image data of a scene from an image sensor, the image data captured using the image sensor while the display is configured to display the light according to the predefined pattern; detecting the predefined pattern within the image data; means for processing, in response to detection of the predefined pattern within the image data, the image data to generate at least one image frame of the scene; and means for outputting the at least one image frame of the scene.

In some aspects, the image sensor is fixed relative to the display. In some aspects, a housing is configured to maintain a relative positioning between the display and the image sensor.

In some aspects, the image sensor is configured to receive incident light from the scene after the incident light from the scene passes through at least a portion of the display, wherein the image data is captured using the image sensor based on receipt of at least the incident light from the scene and the light displayed by the display according to the predefined pattern.

In some aspects, one or more of the methods, apparatuses, and computer-readable medium described above further comprise: encoding the image data and an indicator of the predefined pattern to generated encoded image data that includes the indicator of the predefined pattern; and decoding the image data based on the indicator of the predefined pattern to process the image data to generate at least one image frame of the scene.

In some aspects, one or more of the methods, apparatuses, and computer-readable medium described above further comprise: before causing the display to display the light according to the predefined pattern, generating at least a portion of the predefined pattern using a random pattern generator. In some aspects, one or more of the methods, apparatuses, and computer-readable medium described above further comprise: before causing the display to display the light according to the predefined pattern, selecting at least one of a plurality of predefined patterns to determine at least a portion of the predefined pattern.

In some aspects, one or more of the methods, apparatuses, and computer-readable medium described above further comprise: subtracting a detection pattern from the image data to process the image data, wherein the detection pattern is based on the predefined pattern. In some aspects, the detection pattern is based on the predefined pattern as detected in the image data. In some aspects, the detection pattern is based on a product of the predefined pattern and a predetermined coefficient. In some aspects, the detection pattern is based on the predefined pattern as adjusted using a predetermined offset. In some aspects, the detection pattern is based on the predefined pattern as scaled according to a scaling factor. In some aspects, the detection pattern is based on the predefined pattern as blurred according to a blurring factor.

In some aspects, the predefined pattern includes a spatial pattern that includes at least one spatial variation. In some aspects, the predefined pattern includes a temporal pattern that includes at least one temporal variation. In some aspects, the predefined pattern includes a luminosity pattern that includes at least one luminosity variation. In some aspects, the predefined pattern includes a chromatic pattern that includes at least one chromatic variation. In some aspects, the predefined pattern includes a light intensity pattern that includes at least one light intensity variation.

In some aspects, one or more of the methods, apparatuses, and computer-readable medium described above further comprise: outputting the at least one image frame of the scene for storage in at least one memory.

In some aspects, one or more of the methods, apparatuses, and computer-readable medium described above further comprise: detecting an object in the at least one image frame of the scene based on an output of a trained machine learning model, wherein the at least one image frame is input into the trained machine learning model.

In some aspects, one or more of the methods, apparatuses, and computer-readable medium described above further comprise: reducing pixel values in the at least one image frame by correction values associated with the predefined pattern.

In some aspects, one or more of the methods, apparatuses, and computer-readable medium described above further comprise: causing the display to display the at least one image frame of the scene. In some aspects, one or more of the methods, apparatuses, and computer-readable medium described above further comprise: causing a communication interface to transmit the at least one image frame of the scene to a recipient device.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
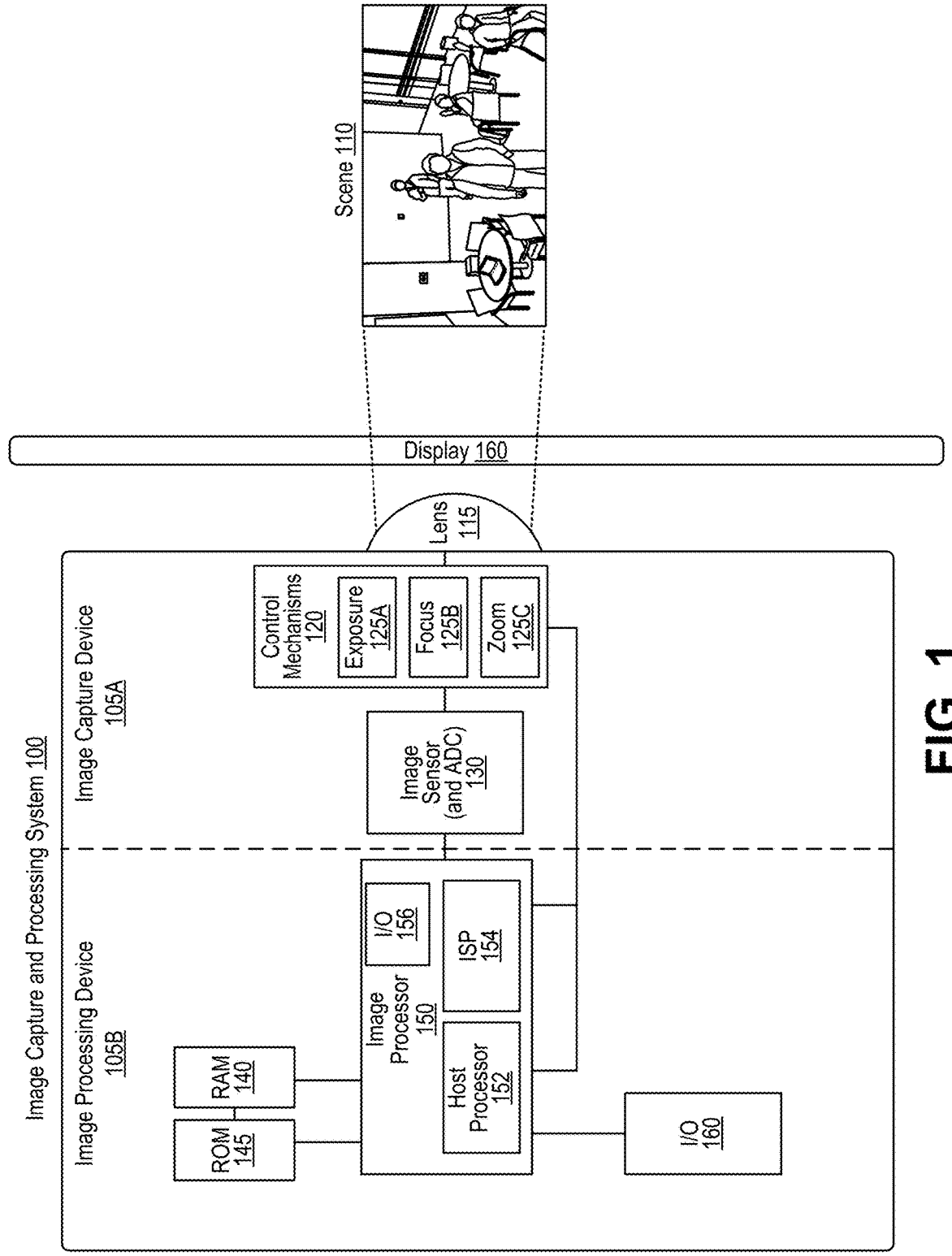
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A device that includes a camera can analyze image data captured by an image sensor to detect, recognize, classify, and/or track an object within the image data. For instance, by detecting and/or recognizing an object in multiple video frames of a video, the device can track movement of the object over time.

In some examples, systems and techniques are described for image processing. An imaging system causes a display to display light according to a predefined pattern. The imaging system receives image data of a scene from an image sensor. The image data is captured using the image sensor while the display is configured to display the light according to the predefined pattern. The imaging system processes the image data to generate at least one image frame of the scene based on detection of the predefined pattern in the image data. The imaging system outputs the at least one image frame of the scene.

The imaging systems and techniques described herein provide a number of technical improvements over other imaging systems. For instance, the display of the predefined pattern, the detection of the predetermined pattern in the image data of the scene, and the processing of the image data of the scene based on detection of the predefined pattern in the image data can technically improve security of the image sensor and display assembly, ensuring that the image sensor and display are arranged as intended, and the image sensor and display are functioning as intended. The imaging systems and techniques described herein can prevent a malicious party from gaining access to data from the image sensor and/or the display, for instance because the image sensor can be configured to prevent access to image data unless the predefined pattern from the display is detected in the image data.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. A display 160 of the system 100 also faces the scene 110, and the light from the scene 110 can pass through the display 160 toward the lens 115. The display 160 outputs light. The display 160 can be configured to output light toward the scene 110, toward the lens 115, or a combination thereof. The lens 115 bends the light (e.g., from the scene 110 and/or from the display 160) toward the image sensor 130. The light received by the lens 115 (e.g., from the scene 110 and/or from the display 160) passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 920, read-only memory (ROM) 145 and/or 925, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 902.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
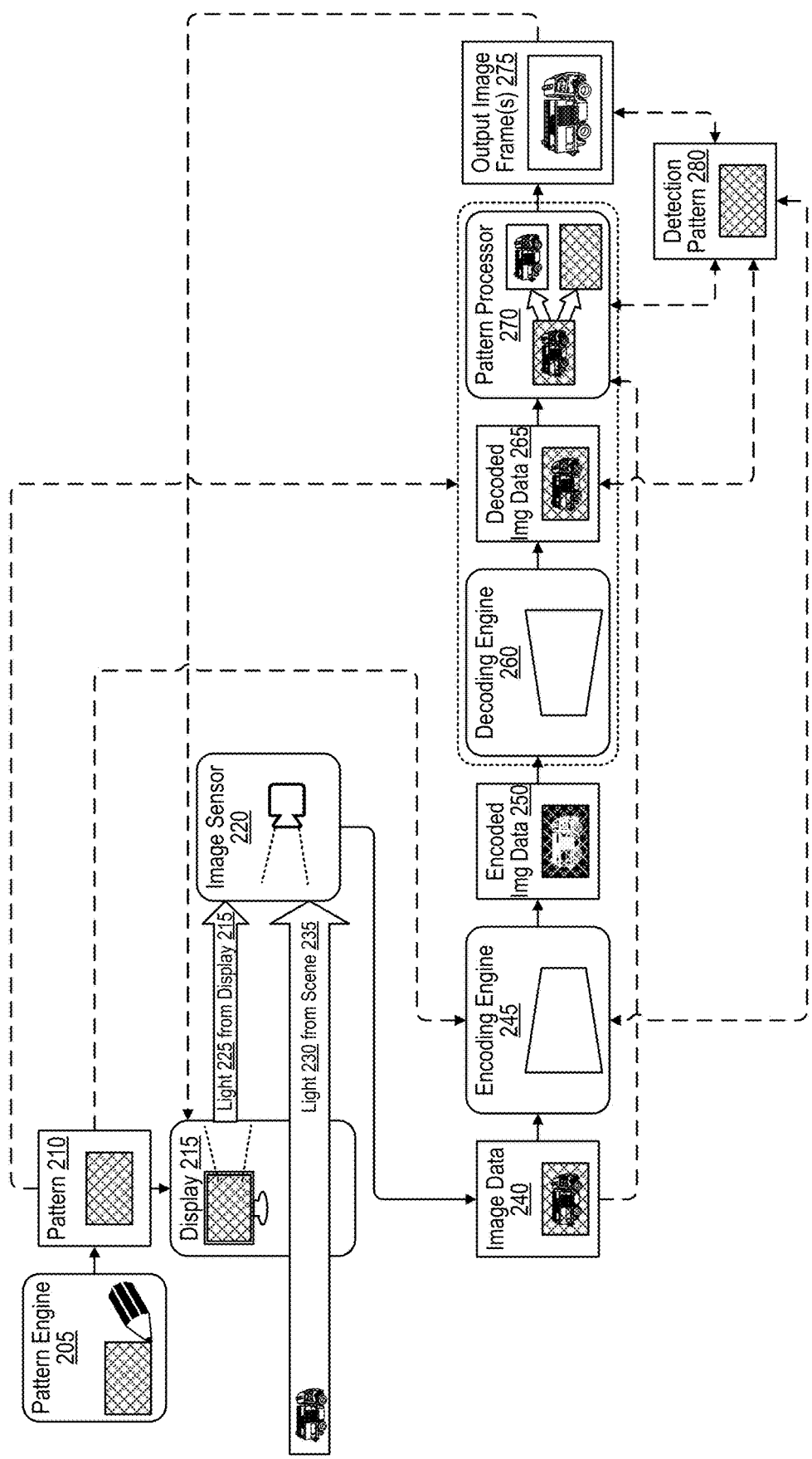
FIG. 2 is a block diagram illustrating an example architecture of an imaging system that performs a process for pattern generation, pattern detection, and pattern-based image processing, in accordance with some examples.

FIG. 2 is a block diagram illustrating an example architecture of an imaging system that performs a process for pattern generation, pattern detection, and pattern-based image processing. The imaging system 200 can include at least one of the image capture and processing system 100, the image capture device 105A, the image processing device 105B, the display 160, the HMD 310, the mobile handset 410, a video source 702, an encoding device 704, a decoding device 712, a video destination device 722, the imaging system that performs the process 800, the computing system 900, the processor 910, or a combination thereof. In some examples, the imaging system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof.

The imaging system 200 includes a pattern engine 205 that identifies a pattern 210 to be displayed using a display 215. In some examples, the pattern engine 205 generates the pattern 210, for instance using a random pattern generator. In some examples, the pattern engine 205 determines the pattern 210 by selecting the pattern 210 (e.g., randomly, according to a predetermined order, or according to image properties of image data from the image sensor 220) from a predetermined set of valid patterns. The pattern 210 may include a spatial pattern that varies spatially across the frame of the display 215, a temporal pattern that varies between a first time (e.g., a first video frame) and a second time (e.g., a second video frame), or a combination thereof. The pattern 210 may include a luminosity pattern of with spatial and/or temporal variation(s) in luminosity, a chromatic pattern of with spatial and/or temporal variation(s) in color, a light intensity pattern with spatial and/or temporal variations in light intensity (e.g., light brightness and/or amplitude and/or strength), or a combination thereof. In some examples, the display 215 can control light intensity on a per-pixel basis, as in an organic light-emitting diode (OLED) display, in which case a light intensity pattern can be spatial and/or temporal. In some examples, the display 215 can control light intensity on a frame-wide basis, as in an liquid crystal display (LCD) or any display with a backlight or frontlight, in which case a light intensity pattern can be temporal. In some examples, the pattern includes a pattern of stripes, dots, grids, lattices, circles, squares, meshes, polygons, geometric shapes, or a combination thereof.

A graphic representing the pattern engine 205 is illustrated in FIG. 2, and illustrates a pencil drawing cross-hatch pattern to represent the pattern engine 205 generating the pattern 210. A graphic representing the pattern 210 is illustrated in FIG. 2, and illustrates the cross-hatch pattern illustrated as generated by the pattern engine 205. A graphic representing the display 215 is illustrated in FIG. 2, and illustrates a display screen outputting the cross-hatch pattern representing the pattern 210.

The imaging system 200 includes at least one image sensor 220 that captures image data 240. The display the pattern 210, the display 215 emits light 225 toward the image sensor 220 according to the pattern 210. The image sensor 220 also receives light 230 from a scene 235. The scene 235 is an example of the scene 110, or vice versa. The light 230 from the scene 235 can pass through at least a portion of the display 215 before reaching the image sensor 220. A graphic representing the scene 235 is illustrated in FIG. 2, and illustrates a scene with a fire truck. The image sensor 220 can be part of an under-display camera that is adjacent to, and under, the display 215. Thus, the image sensor 220 captures the image data 240 based on receipt of both the light 225 from the display 215 (while the display is emitting the light 225 according to the pattern 210) and the light 230 (e.g., incident light) from the scene 235. In some examples, a housing of the imaging system 200 is configured to, and can, maintain a static relative positioning between the display 215 and the image sensor 220, so that the display 215 and the image sensor 220 to not move relative to one another even when imaging system 200 moves.

Examples of the image sensor 220 include the image capture and processing system 100, the image capture device 105A, the image processing device 105B, the image sensor 130, image sensor(s) of any of cameras 330A-330D, image sensor(s) of any of cameras 430A-430D, an image sensor that captures the input image 615, an image sensor of the video source 702, the image sensor of the imaging process 800, an image sensor of an input device 945, or a combination thereof. In some examples, the image data 240 includes raw image data, image data, pixel data, image frame(s), raw video data, video data, video frame(s), or a combination thereof. The image sensor 220 can include an array of photodetectors. The photodetectors of the image sensor can be sensitive to one or more subsets of the electromagnetic (EM) frequency domain, such as the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, a subset of any of these, or a combination thereof. In some examples, different photodetectors of the image sensor can be configured to be sensitive to different EM frequency domains and/or different color channels. In some examples, the image sensor 220 captures multiple image frames configured to be arranged in a sequence to form a video, and the image data 240 includes at least a subset of the video (e.g., at least one video frame of the video).

In some examples, the image sensor 220 can be directed toward a user (e.g., can face toward the user), and can thus capture sensor data (e.g., image data) of (e.g., depicting or otherwise representing) at least portion(s) of the user. In some examples, the image sensor 220 can be directed away from the user (e.g., can face away from the user) and/or toward an environment that the user is in, and can thus capture sensor data (e.g., image data) of (e.g., depicting or otherwise representing) at least portion(s) of the environment. In some examples, image data 240 captured by the image sensor 220 is directed away from the user and/or toward the user. In some examples, image data 240 captured by the image sensor 220 is can have a field of view (FoV) that includes, is included by, overlaps with, and/or otherwise corresponds to, a FoV of the eyes of the user.

In some examples, image sensor 220 can be, can include, and/or can be supplemented with (in the imaging system 200) other types of sensors other than image sensors. In some examples, the imaging system 200 can also include one or more other sensors in addition to the image sensor 220, such as one or more other image sensors and/or one or more other types of sensors. Sensor types can include, for instance, image sensors, cameras, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, the input device 945, other sensors discussed herein, or combinations thereof. In some implementations, one or more of these additional sensor(s) may complement or refine sensor readings from the image sensor 220. For example, Inertial Measurement Units (IMUs), accelerometers, gyroscopes, or other sensors may be used to identify a pose (e.g., position and/or orientation) and/or motion(s) and/or acceleration(s) of the imaging system 200 and/or of the user in the environment, which can be used by the imaging system 200 to reduce motion blur, rotation blur, or combinations thereof.

A graphic representing the image sensor 220 is illustrated in FIG. 2, and illustrates a camera pointed toward the graphics representing the display 215 and the scene 235. A graphic representing the image data 240 is illustrated in FIG. 2, and illustrates a fire truck (representing a depiction of the scene 235 based on the light 230 from the scene 235) with a cross-hatch pattern (representing the pattern 210 based on the light 225 from the display 215).

The imaging system 200 includes an encoding engine 245 that encodes the image data 240 to generate encoded image data 250. In some examples, the encoding engine 245 includes an encoding device 704, an encoding engine 706, or a combination thereof. In some examples, the encoding engine 245 encodes the image data 240 to generate the encoded image data 250 as discussed with respect to the encoding device 704 and/or the encoding engine 706 encoding video data from the video source 702. In some examples, the encoding engine 245 first checks the image data 240 to determine if the image data includes a representation of the pattern 210 before encoding the image data 240 to generate the encoded image data 250.

The imaging system 200 includes a decoding engine 260 that decodes the encoded image data 250 to generate decoded image data 265. In some examples, the decoding engine 260 includes a decoding device 712, a decoding engine 716, or a combination thereof. In some examples, the decoding engine 260 decodes the encoded image data 250 to generate the decoded image data 265 as discussed with respect to the decoding device 712 and/or the decoding engine 716 decoding video data from the input 714 to generate decoded video data that is output to storage 718 and/or the video destination device 722.

In some examples, the encoding engine 245 encodes the image data 240 to generate the encoded image data 250 at least in part by adding and/or multiplying the pattern 210, or a second pattern generated and/or selected by the pattern engine 205, to the image data 240. In some examples, the decoding engine 260 decodes the encoded image data 250 to generate the decoded image data 265 at least in part by subtracting and/or dividing the pattern 210, or a second pattern generated and/or selected by the pattern engine 205, from the encoded image data 250.

Respective graphics representing the encoding engine 245 and the decoding engine 260 are illustrated in FIG. 2, and are illustrated as trapezoids facing opposite directions to represent the encoding and decoding processes. A graphic representing the encoded image data 250 depicts an inverted variation of the firetruck and an inverted variation of the pattern 210, to illustrate that the encoding process modifies the image data. A graphic representing the decoded image data 265 depicts the firetruck and the pattern 210, to illustrate that the decoding process can reconstruct the image data 240.

The imaging system 200 includes a pattern processor 270. The pattern processor 270 detects, within the decoded image data 265, the encoded image data 250, and/or the image data 240, a detection pattern 280. The detection pattern 280 is based on the pattern 210. For instance, in some examples, the pattern processor 270 subtracts, reduces, or removes the detection pattern 280 from the decoded image data 265, the encoded image data 250, and/or the image data 240, to generate one or more output image frames 275. In some examples, the detection pattern 280 is based on a product of the pattern 210 and a predetermined coefficient (e.g., coefficient c in Equation 625). In some examples, the detection pattern 280 is based on the pattern 210 is adjusted (e.g., increased or decreased) using a predetermined offset (e.g., that is added or subtracted from the pixel values of the pattern 210). For instance, some of the light 225 from the display 215 may be scattered or absorbed before it reaches the image sensor 220. In some examples, the detection pattern 280 is based on the pattern 210 as scaled (e.g., to be larger or smaller) according to a scaling factor. In some examples, the detection pattern 280 is based on the pattern 210 as blurred according to a blurring factor (e.g., Gaussian blur). For instance, some of the light 225 from the display 215 may be warped, distorted, reflected, and/or refracted before it reaches the image sensor 220.

A graphic representing the pattern processor 270 depicts splitting of the image data 240 and/or the decoded image data 265 into the output image frame(s) 275 depicting the scene 235 and the pattern (e.g., the pattern 210 and/or detection pattern 280). A graphic representing the output image frame(s) 275 depict the fire truck representing the scene 235. In some examples, the pattern processor 270 and/or the decoding engine 260 may be a single, combined component, as illustrated by a dotted-lined box around the pattern processor 270, the decoded image data 265, and the decoding engine 260. The output of the combined component is the output image frame(s) 275.

In some examples, the imaging system 200 outputs the output image frame(s) 275 by storing the output image frame(s) 275 in at least one memory (e.g., cache 912, memory 915, ROM 920, RAM 925, storage device 930, or a combination thereof). In some examples, the imaging system 200 outputs the output image frame(s) 275 by displaying the output image frame(s) 275 using the display 215 or another display (e.g., output device 935). In some examples, the imaging system 200 outputs the output image frame(s) 275 by transmitting the output image frame(s) 275 to a recipient device using a communication interface (e.g., output device 935, communication interface 940, or a combination thereof).

Figure 3A:
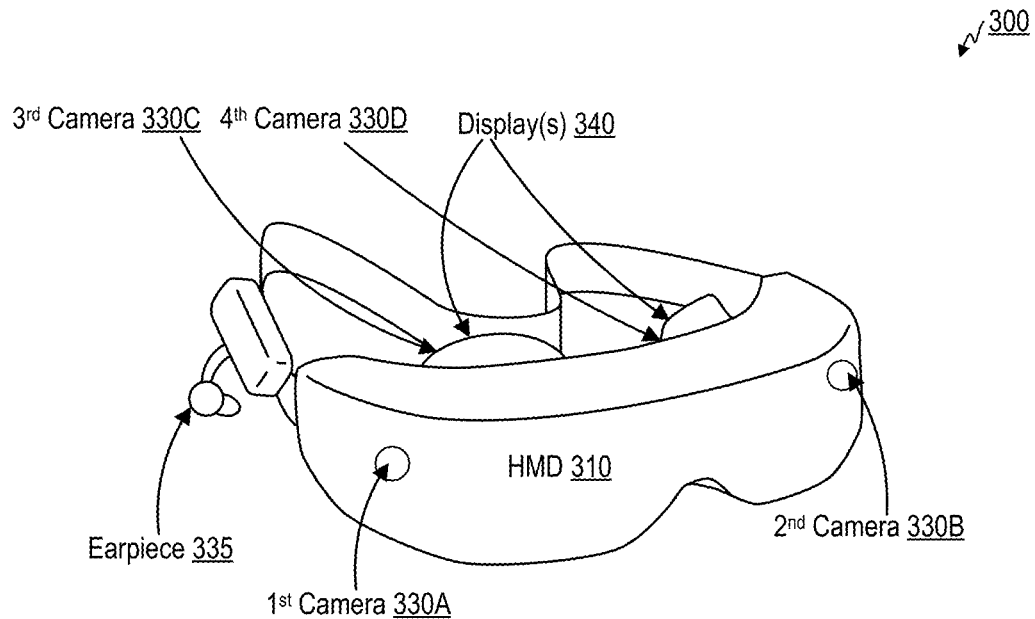
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of a imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of a imaging system 200. The HMD 310 includes a first camera 330A and a second camera 330B along a front portion of the HMD 310. The first camera 330A and the second camera 330B may be examples of the image sensor 220 of the imaging system 200. The HMD 310 includes a third camera 330C and a fourth camera 330D facing the eye(s) of the user as the eye(s) of the user face the display(s) 340. The third camera 330C and the fourth camera 330D may be examples of the image sensor 220 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of image sensor 220 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the display 160, the display 215, the output device 935, or a combination thereof. In some examples, the third camera 330C and/or the fourth camera 330D can be under-display cameras under the display(s) 340, so that light 230 from the scene 235 passes through the display(s) 340 to reach the third camera 330C and/or the fourth camera 330D, in some cases while the display(s) 340 display the pattern 210. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
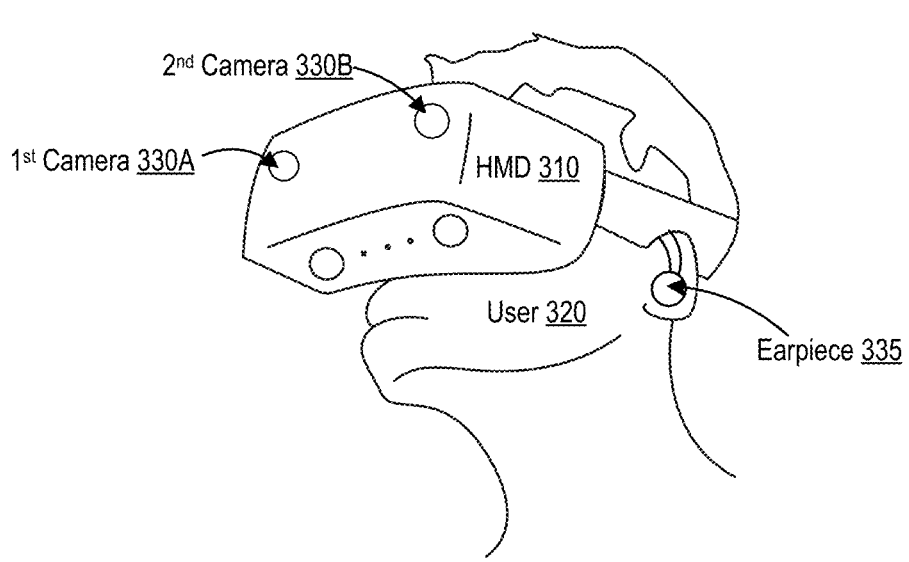
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s). One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the output image frame(s) 275. The output images can be based on the images captured by the first camera 330A and the second camera 330B (e.g., the image data 240), for example after encoding and decoding, and/or with the pattern (e.g., pattern 210 and/or decoding pattern 280) removed or reduced. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
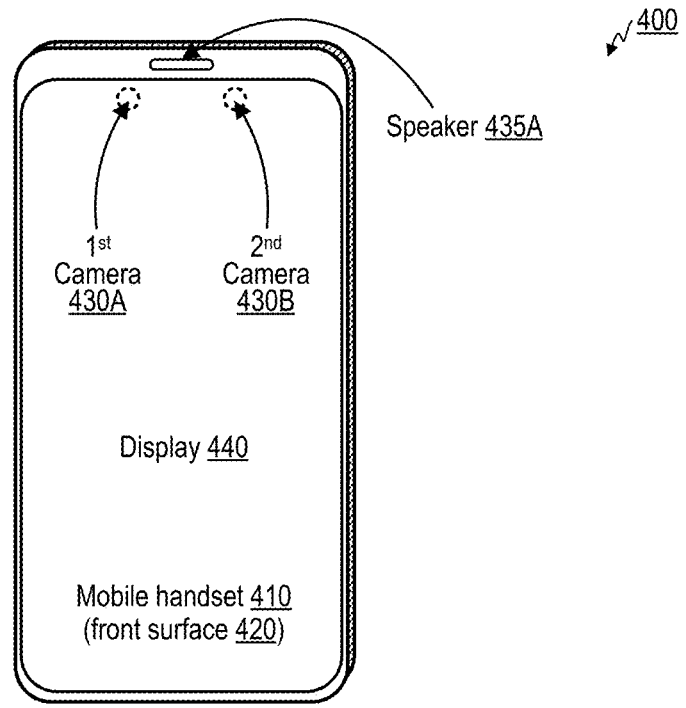
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200.

The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the image sensor 220 of the imaging system 200. The first camera 430A and the second camera 430B can face the user, including the eye(s) of the user, while the pattern (e.g., the pattern 210 and/or the detection pattern 280) is displayed on the display 440. The display 440 may be an example of the display(s) of the display 215 of the imaging system 200.

The first camera 430A and the second camera 430B are illustrated as under-display cameras under the display 440, so that light 230 from the scene 235 passes through the display 440 to reach the first camera 430A and the second camera 430B, in some cases while the display 440 display the pattern 210. In some, examples, the first camera 430A and/or the second camera 430B can instead be positioned in a bezel, notch, or cutout that is cut out from the display 440 or in a bezel of the display 440. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the output image frame(s) 275. The output images can be based on the images captured by the first camera 430A, the second camera 430B, the third camera 430C, and/or the fourth camera 430D (e.g., the image data 240), for example after encoding and decoding, and/or with the pattern (e.g., pattern 210 and/or decoding pattern 280) removed or reduced.

In some examples, the front surface 420 of the mobile handset 410 may include one or more additional cameras in addition to the first camera 430A and the second camera 430B. The one or more additional cameras may also be examples of the image sensor 220 of the imaging system 200. In some examples, the front surface 420 of the mobile handset 410 may include one or more additional sensors in addition to the first camera 430A and the second camera 430B. The one or more additional sensors may also be examples of the image sensor 220 of the imaging system 200. In some cases, the front surface 420 of the mobile handset 410 includes more than one display 440. The one or more displays 440 of the front surface 420 of the mobile handset 410 can be examples of the display(s) of the display 215 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410, with these microphones being examples of the image sensor 220 of the imaging system 200. In some examples, the audio output by the mobile handset 410 to the user through the one or more speakers 435A and/or other audio output devices may include, or be based on, audio recorded using the one or more microphones.

Figure 4B:
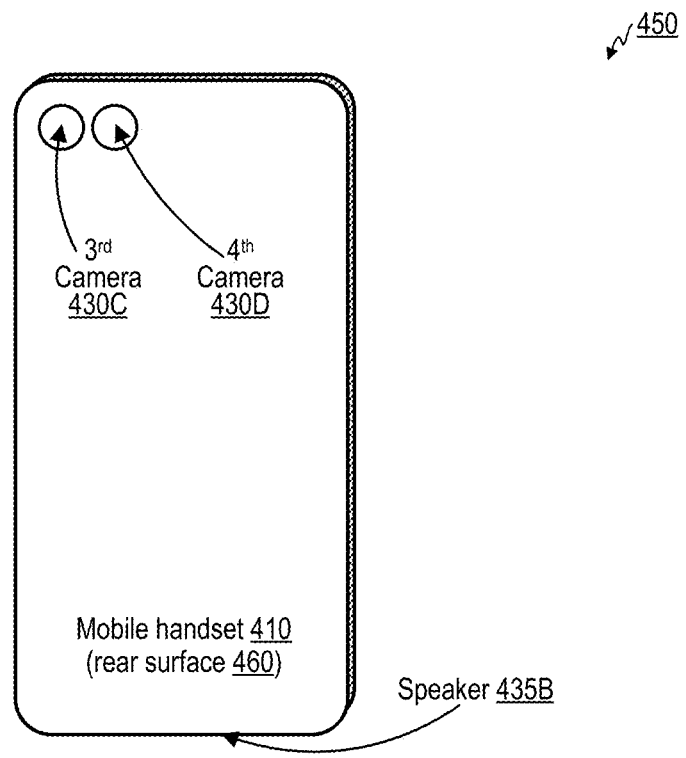
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of a imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the image sensor 220 of the imaging system 200. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the image sensor 220 of the imaging system 200. In some examples, the rear surface 460 of the mobile handset 410 may include one or more additional sensors in addition to the third camera 430C and the fourth camera 430D. The one or more additional sensors may also be examples of the image sensor 220 of the imaging system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410, with these microphones being examples of the image sensor 220 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images. In some examples, the output images can include the output image frame(s) 275. The output images can be based on the images captured by the first camera 430A, the second camera 430B, the third camera 430C, and/or the fourth camera 430D (e.g., the image data 240), for example after encoding and decoding, and/or with the pattern (e.g., pattern 210 and/or decoding pattern 280) removed or reduced. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
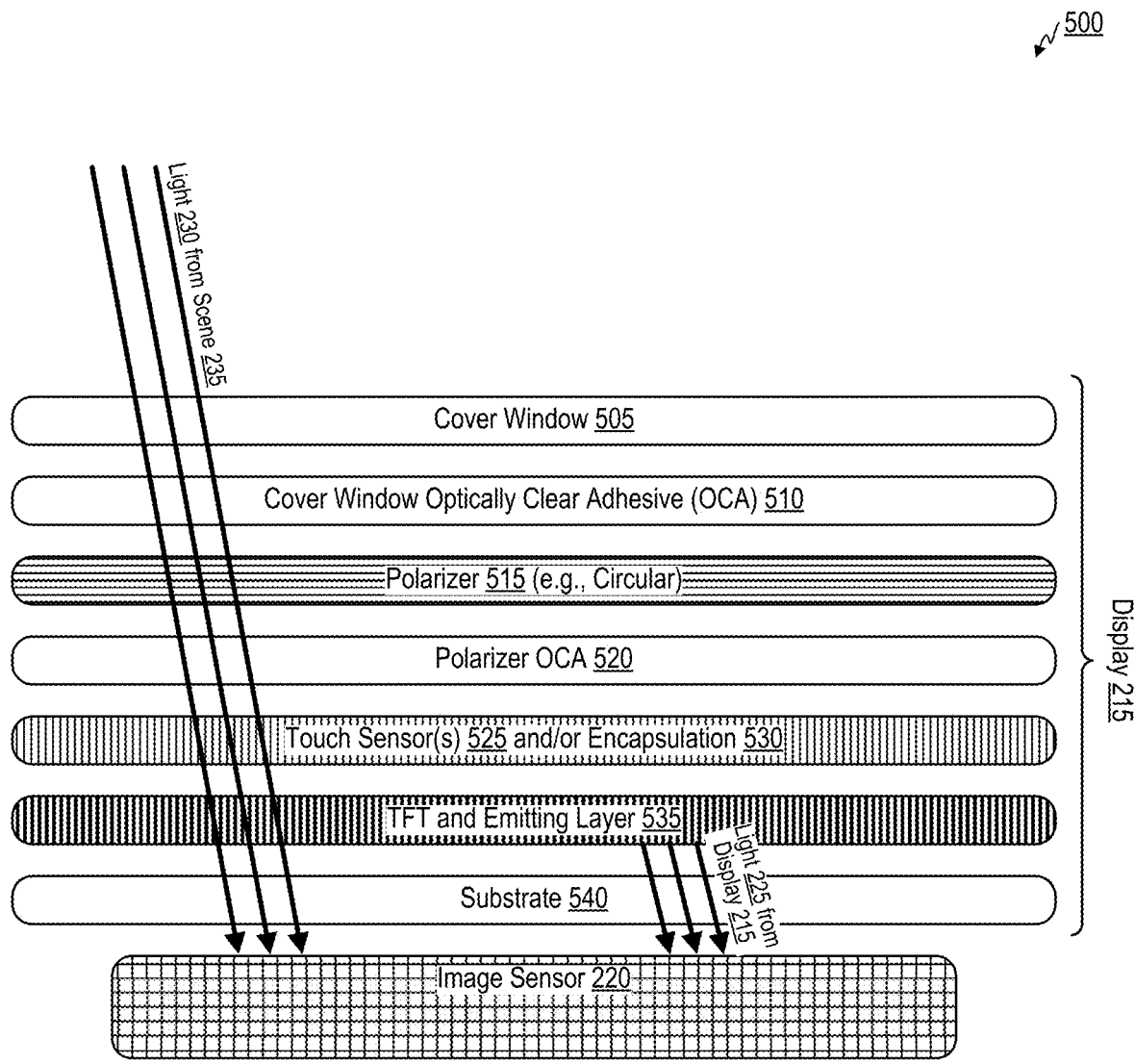
FIG. 5 is a block diagram illustrating light from a scene passing layers of a display to reach an image sensor, in accordance with some examples.

FIG. 5 is a block diagram 500 illustrating light 230 from a scene 235 passing layers of a display 215 to reach an image sensor 220. The light 230 from the scene 235 can pass passes through layers of the display 215 before reaching the image sensor 220. The layers of the display 215 include at least some of a cover window 505, a cover window optically clear adhesive (OCA) 510, a polarizer 515 (e.g., circular polarizer), a polarizer OCA 520, touch sensor(s) 525 (e.g., capacitive and/or resistive), encapsulation 530, a display emitting layer 535 (e.g., thin film transistor (TFT), light emitting diode (LED), organic LED (OLED), liquid crystal display (LCD), in-panel switching (IPS), and/or plasma), a substrate 540, other OCA layer(s), or a combination thereof. Light 225 from the display 215 comes from the display emitting layer 535 and can pass through certain layer(s) of the display 215 (e.g., the substrate 540 and/or other OCA layer(s)) before reaching the image sensor 220.

Figure 6:
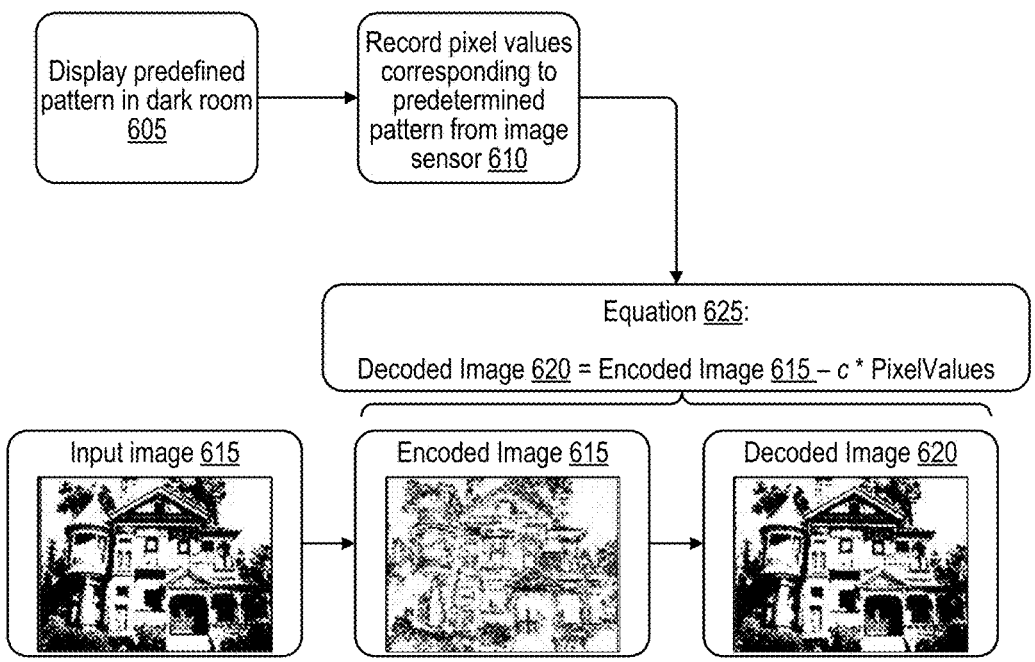
FIG. 6 is a block diagram illustrating an input image, an encoded image, and a decoded image, as well as operations for image processing based on a predefined pattern, in accordance with some examples.

FIG. 6 is a block diagram 600 illustrating an input image 615, an encoded image 615, and a decoded image 620, as well as operations for image processing based on a predefined pattern. The illustrated input image 615 may be example of the image data 240. The illustrated encoded image 615 may be example of the encoded image data 250. The illustrated decoded image 620 may be example of the decoded image data 265 and/or the output image frame(s) 275.

The operations for image processing illustrated in FIG. 6 may be performed by an imaging system. In some examples, the imaging system can include, for example, the image capture and processing system 100, the image capture device 105A, the image processing device 105B, the image processor 150, the ISP 154, the host processor 152, the display 160, the imaging system 200, the pattern engine 205, the display 215, the image sensor 220, the encoding engine 245, the decoding engine 260, the pattern processor 270, the HMD 310, the mobile handset 410, the layer(s) of the display 215 of FIG. 5, the imaging system that performs the operations of FIG. 6, the system 700, the video source 702, the encoding device 704, the encoding engine 706, the decoding device 712, the decoder engine 716, the video destination device 722, the computing system 900, the processor 910, an apparatus, a non-transitory computer-readable medium coupled to at least one processor, or a combination thereof. In some examples, at operation 605, the imaging system can be calibrated by displaying a predefined pattern (e.g., pattern 210) in a dark room. At operation 610, the imaging system can record pixel values from an image sensor while the pattern is displayed by the display at operation 605. Based on this calibration, the decoding engine 260 and/or the pattern processor 270 can perform decoding and/or pattern processing according to Equation 625, where decoded image 620 is equal to the encoded image 615 minus a product of the pixel values (corresponding to the pattern 210 as determined in operation 610) and a coefficient c. The coefficient c ma be tunable based on correlated color temperature (CCT), lux indices, different light source attributes, and/or other image capture and/or image processing parameters.

Figure 7:
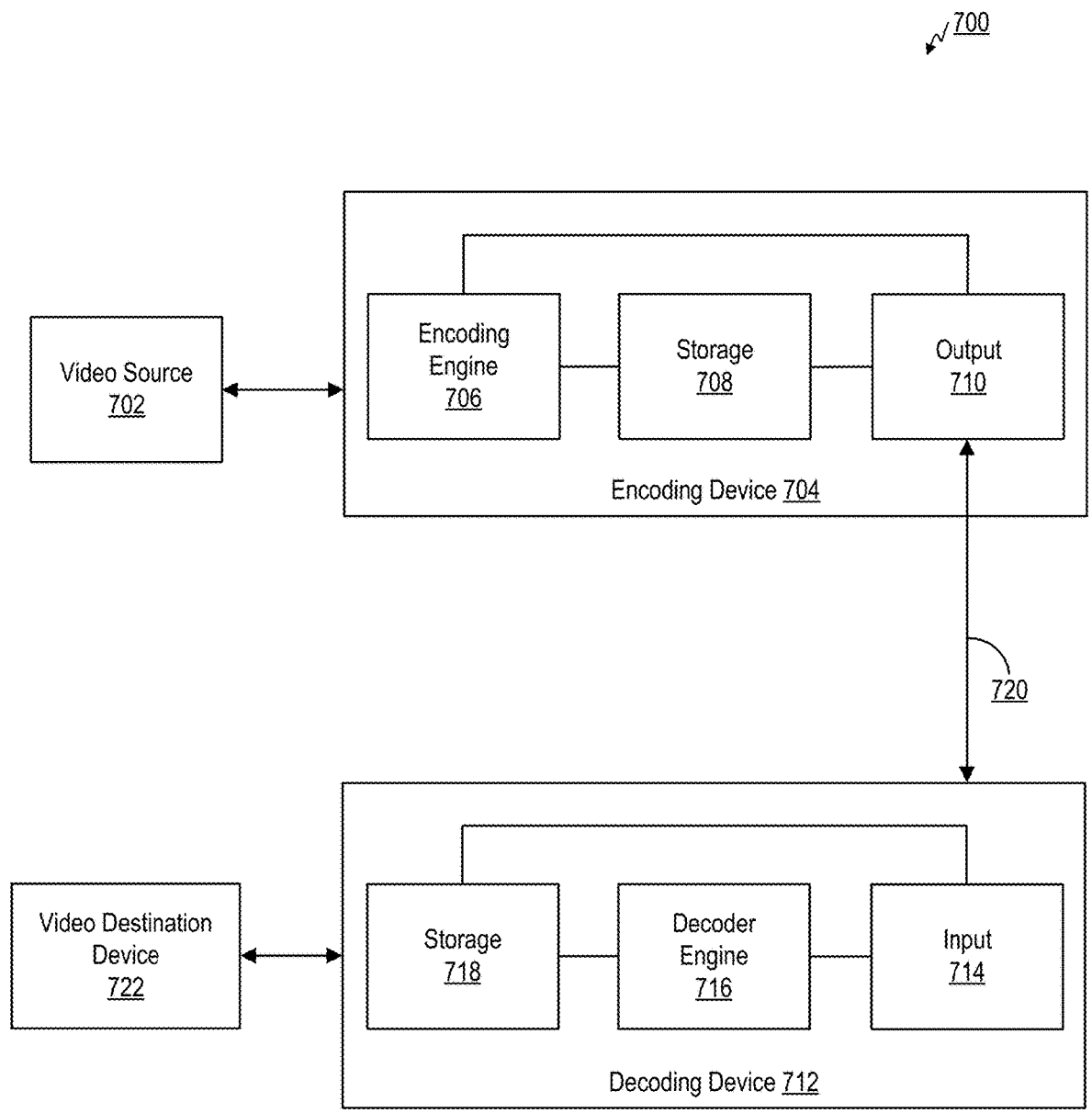
FIG. 7 is a block diagram illustrating an example of a system including an encoding device and a decoding device, in accordance with some examples.

FIG. 7 is a block diagram illustrating an example of a system 700 including an encoding device 704 and a decoding device 712. The encoding device 704 may be part of a source device, and the decoding device 712 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 700 can support one-way or two-way video transmission to support applications such as video conferencing, video streaming, video playback, video broadcasting, gaming, and/or video telephony.

The encoding device 704 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video codecs and/or coding formats for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable codecs and/or coding formats already available or not yet available or developed. Accordingly, while the techniques and systems described herein may be described with reference to a particular video coding standard, one of ordinary skill in the art will appreciate that the description should not be interpreted to apply only to that particular standard.

Many embodiments described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 7, a video source 702 may provide the video data to the encoding device 704. The video source 702 may be part of the source device, or may be part of a device other than the source device. The video source 702 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 702 may include one or more input pictures or frames. A picture or frame is a still image that, in some cases, is part of a video. In some examples, data from the video source 702 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

Two classes of Network Abstraction Layer (NAL) units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 706 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 706.

Once the pictures of the video data are partitioned into CUs, the encoder engine 706 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 706 and decoder engine 716 (described in more detail below) may be configured to operate according to VVC. According to VVC, a video coder (such as encoder engine 706 and/or decoder engine 716) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 704 can perform transformation and quantization. For example, following prediction, the encoder engine 706 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 706 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 706. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 706 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 706 may form the TUs including the residual data for the CU, and may then transform the TUs to produce transform coefficients for the CU.

The encoder engine 706 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 706. In some examples, the encoder engine 706 may utilize a predefined scan order to scan the quantized transform coefficients to produce a serialized vector that can be entropy encoded. In some examples, encoder engine 706 may perform an adaptive scan. After scanning the quantized transform coefficients to form a vector (e.g., a one-dimensional vector), the encoder engine 706 may entropy encode the vector. For example, the encoder engine 706 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 712 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 710 of the encoding device 704 may send the NAL units making up the encoded video bitstream data over the communications link 720 to the decoding device 712 of the receiving device. The input 714 of the decoding device 712 may receive the NAL units. The communications link 720 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 704 may store encoded video bitstream data in storage 708. The output 710 may retrieve the encoded video bitstream data from the encoder engine 706 or from the storage 708. Storage 708 may include any of a variety of distributed or locally accessed data storage media. For example, the storage 708 may include a hard drive, a storage disc, flash memory, volatile or non-volatile memory, or any other suitable digital storage media for storing encoded video data. The storage 708 can also include a decoded picture buffer (DPB) for storing reference pictures for use in inter-prediction. In a further example, the storage 708 can correspond to a file server or another intermediate storage device that may store the encoded video generated by the source device. In such cases, the receiving device including the decoding device 712 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 708 may be a streaming transmission, a download transmission, or a combination thereof.

The input 714 of the decoding device 712 receives the encoded video bitstream data and may provide the video bitstream data to the decoder engine 716, or to storage 718 for later use by the decoder engine 716. For example, the storage 718 can include a DPB for storing reference pictures for use in inter-prediction. The receiving device including the decoding device 712 can receive the encoded video data to be decoded via the storage 708. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 716 may decode the encoded video bitstream data by entropy decoding (e.g., using an entropy decoder) and extracting the elements of one or more coded video sequences making up the encoded video data. The decoder engine 716 may then rescale and perform an inverse transform on the encoded video bitstream data. Residual data is then passed to a prediction stage of the decoder engine 716. The decoder engine 716 then predicts a block of pixels (e.g., a PU). In some examples, the prediction is added to the output of the inverse transform (the residual data).

The decoding device 712 may output the decoded video to a video destination device 722, which may include a display or other output device for displaying the decoded video data to a consumer of the content. In some aspects, the video destination device 722 may be part of the receiving device that includes the decoding device 712. In some aspects, the video destination device 722 may be part of a separate device other than the receiving device.

In some embodiments, the video encoding device 704 and/or the video decoding device 712 may be integrated with an audio encoding device and audio decoding device, respectively. The video encoding device 704 and/or the video decoding device 712 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 704 and the video decoding device 712 may be integrated as part of a combined encoder/decoder (codec) in a respective device.

The example system shown in FIG. 7 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 712 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 8:
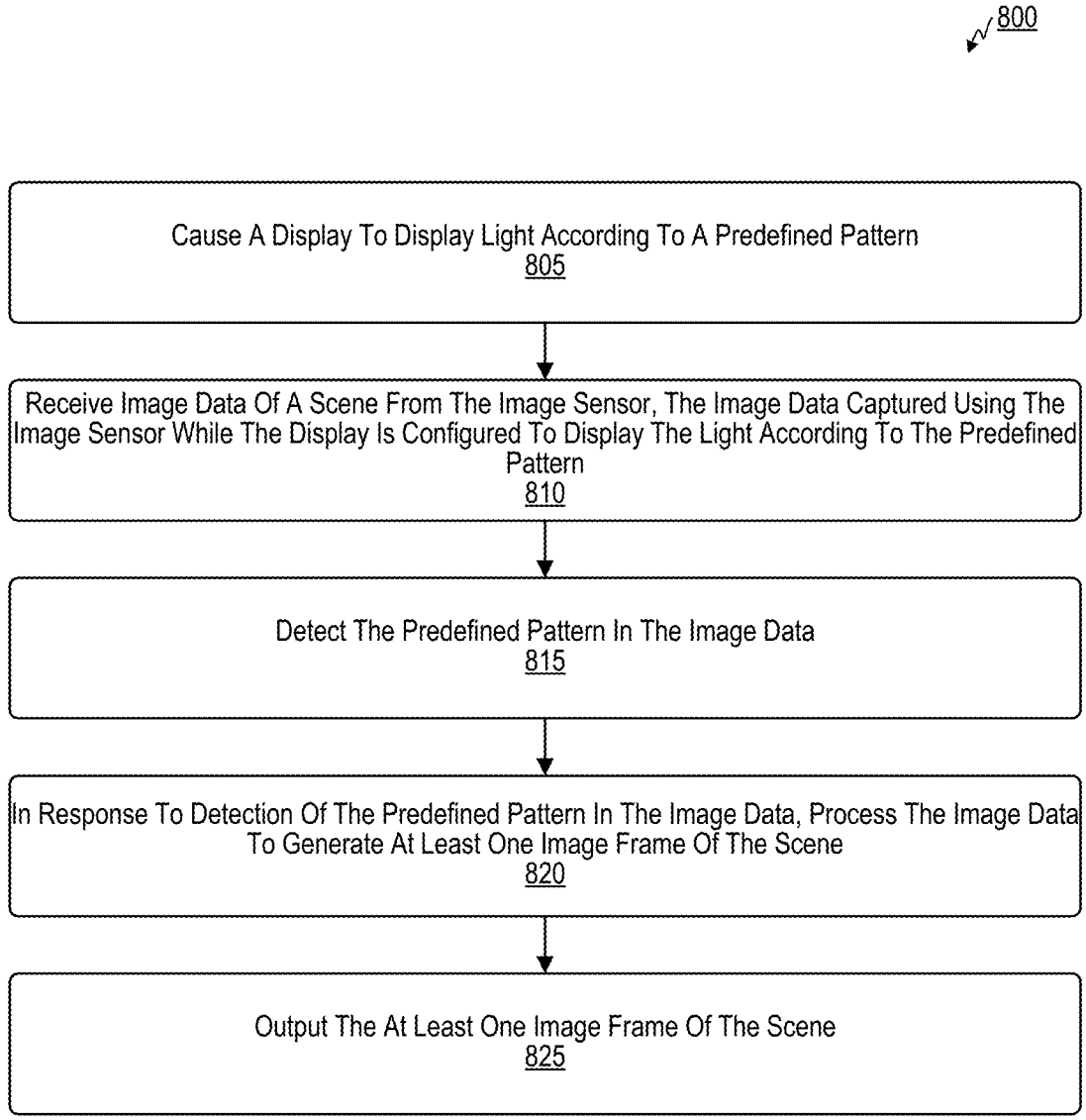
FIG. 8 is a flow diagram illustrating a process for imaging, in accordance with some examples.

FIG. 8 is a flow diagram illustrating a process 800 for imaging. The process 800 may be performed by an imaging system. In some examples, the imaging system can include, for example, the image capture and processing system 100, the image capture device 105A, the image processing device 105B, the image processor 150, the ISP 154, the host processor 152, the display 160, the imaging system 200, the pattern engine 205, the display 215, the image sensor 220, the encoding engine 245, the decoding engine 260, the pattern processor 270, the HMD 310, the mobile handset 410, the layer(s) of the display 215 of FIG. 5, the imaging system that performs the operations of FIG. 6, the system 700, the video source 702, the encoding device 704, the encoding engine 706, the decoding device 712, the decoder engine 716, the video destination device 722, the computing system 900, the processor 910, an apparatus, a non-transitory computer-readable medium coupled to at least one processor, or a combination thereof.

At operation 805, the imaging system is configured to, and can, cause a display to display light according to a predefined pattern. Examples of the display include the display 160, the display 215, the display(s) 340, the display 440, the TFT and Emitting Layer 535, the output device 935, or a combination thereof. Examples of the predefined pattern include the pattern 210, the predefined pattern displayed at operation 605, another pattern discussed herein, or a combination thereof.

In some aspects, the predefined pattern includes a spatial pattern that includes at least one spatial variation, a temporal pattern that includes at least one temporal variation, a luminosity pattern that includes at least one luminosity variation, a chromatic pattern that includes at least one chromatic variation, a light intensity pattern that includes at least one light intensity variation, another type of pattern discussed herein, or a combination thereof.

At operation 810, the imaging system is configured to, and can, receive image data of a scene from the image sensor, the image data captured using the image sensor while the display is configured to display the light according to the predefined pattern.

Examples of the image sensor includes the image sensor 130, the image sensor 220, the first camera 330A, the second camera 330B, the third camera 330C, the fourth camera 330D, the first camera 430A, the second camera 430B, the third camera 430C, the fourth camera 430D, an image sensor used to capture the input image 615, an image sensor of the video source 702, the input device 945, another image sensor described herein, another sensor described herein, or a combination thereof. Examples of the image data include the image data 240, the input image 615, image(s) captured by the video source 702, image(s) captured by the input device 945, or a combination thereof.

In some aspects, the image sensor is fixed (e.g., positionally) relative to the display, for instance as in FIG. 5 (e.g., the image sensor 220 is fixed relative to the display 215 and/or the TFT and emitting layer 535 of FIG. 5). In some aspects, a housing of the imaging system is configured to maintain a relative positioning between the display and the image sensor. For instance, the housing can maintain the relative positioning between the display and the image sensor illustrated in FIG. 5 (e.g., between the display 215 and the image sensor 220 in FIG. 5).

In some aspects, the image sensor is configured to receive incident light from the scene after the incident light from the scene passes through at least a portion of the display (e.g., as in the light 230 from the scene 235 passing through the display 215 in FIG. 5). The image data is captured using the image sensor based on receipt of at least the incident light from the scene (e.g., the light 230 from the scene 235) and the light displayed by the display (e.g., the light 225 from the display 215) according to the predefined pattern.

In some aspects, before causing the display to display the light according to the predefined pattern, the imaging system is configured to, and can, generate (e.g., using the pattern engine 205) at least a portion of the predefined pattern (e.g., the pattern 210) using a random pattern generator (e.g., that may be part of the pattern engine 205). In some aspects, before causing the display to display the light according to the predefined pattern the imaging system is configured to, and can, select (e.g., using the pattern engine 205) at least one of a plurality of predefined patterns (e.g., that may be predefined and/or stored by the pattern engine 205) to determine at least a portion of the predefined pattern (e.g., the pattern 210).

At operation 815, the imaging system is configured to, and can, process the image data (e.g., using the encoding engine 245, the decoding engine 260, and/or the pattern processor 270) to generate at least one image frame (e.g., the output image frame(s) 275) of the scene based on detection of the predefined pattern in the image data.

In some aspects, the imaging system is configured to, and can, encode (e.g., via the encoding engine 245) the image data (e.g., the image data 240) and an indicator of the predefined pattern (e.g., the pattern 210) to generated encoded image data (e.g., encoded image data 250) that includes the indicator of the predefined pattern. The imaging system can decode (e.g., via the decoding engine 260) the image data based on the indicator of the predefined pattern (e.g., the pattern 210) to process the image data (e.g., via the decoding engine 260 and/or the pattern processor 270) to generate at least one image frame (e.g., the output image frame(s) 275) of the scene.

In some aspects, the imaging system is configured to, and can, subtract a detection pattern (e.g., detection pattern 280) from the image data (e.g., from the decoded image data 265, the encoded image data 250, and/or the image data 240) to process the image data. The detection pattern is based on the predefined pattern (e.g., the pattern 210). In some aspects, the detection pattern is based on the predefined pattern as detected in the image data (e.g., in the image data 240, the encoded image data 250, and/or the decoded image data 265). In some aspects, the detection pattern is based on a product of the predefined pattern and a predetermined coefficient (e.g., coefficient c in Equation 625). In some aspects, the detection pattern is based on the predefined pattern as adjusted using a predetermined offset (e.g., that is added or subtracted from the pixel values of the pattern 210). In some aspects, the detection pattern is based on the predefined pattern as scaled (e.g., to be larger or smaller) according to a scaling factor. In some aspects, the detection pattern is based on the predefined pattern as blurred according to a blurring factor (e.g., Gaussian blur). In some aspects, the imaging system is configured to, and can, reduce pixel values in the at least one image frame by correction values (e.g., from the detection pattern 280) associated with the predefined pattern (e.g., the pattern 210).

At operation 820, the imaging system is configured to, and can, output the at least one image frame of the scene. In some aspects, the imaging system is configured to, and can, output the at least one image frame of the scene for storage in at least one memory. In some aspects, the imaging system is configured to, and can, cause the display to display the at least one image frame of the scene. In some aspects, the imaging system is configured to, and can, cause a communication interface (e.g., communication interface 940) to transmit the at least one image frame of the scene to a recipient device.

In some aspects, the imaging system is configured to, and can, detect an object in the at least one image frame of the scene based on an output of a trained machine learning (ML) model. The at least one image frame is input into the trained ML model. The trained ML model can include, for instance one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. The trained ML model can be part of a feature extractor, a feature detector, a feature recognizer, a feature tracker, an object detector, an object recognizer, an object tracker, a face detector, a face recognizer, a face tracker, a person detector, a person recognizer, a person tracker, a classifier, or a combination thereof. The trained ML model can be trained, using training data, to perform feature extraction, feature detection, feature recognition, feature tracking, object detection, object recognition, object tracking, face detection, face recognition, face tracking, person detection, person recognition, person tracking, classification, or a combination thereof.

In some examples, the imaging system includes means for causing a display to display light according to a predefined pattern; means for receiving image data of a scene from an image sensor, the image data captured using the image sensor while the display is configured to display the light according to the predefined pattern; detecting the predefined pattern within the image data; means for processing, in response to detection of the predefined pattern within the image data, the image data to generate at least one image frame of the scene; and means for outputting the at least one image frame of the scene.

The means for causing the display the display the light according to the predefined pattern can include the display 160, the pattern engine 205, the display 215, the HMD 310, the display(s) 340, the mobile handset 410, the display 440, the layer(s) of the display 215 of FIG. 5, the imaging system that performs the operations of FIG. 6, or a combination thereof. The means for causing receiving the image data of the scene from the image sensor include the image capture and processing system 100, the image capture device 105A, the imaging system 200, the image sensor 220, the HMD 310, the first camera 330A, the second camera 330B, the third camera 330C, the fourth camera 330D, the mobile handset 410, the first camera 430A, the second camera 430B, the third camera 430C, the fourth camera 430D, an image sensor used to capture the input image 615, an image sensor of the video source 702, the input device 945, or a combination thereof.

The means for causing detecting the predefined pattern within the image, processing the image data to generate the at least one image frame, and outputting the at least one image frame include the image capture and processing system 100, the image capture device 105A, the image processing device 105B, the image processor 150, the ISP 154, the host processor 152, the display 160, the imaging system 200, the pattern engine 205, the display 215, the image sensor 220, the encoding engine 245, the decoding engine 260, the pattern processor 270, the HMD 310, the mobile handset 410, the layer(s) of the display 215 of FIG. 5, the imaging system that performs the operations of FIG. 6, the system 700, the video source 702, the encoding device 704, the encoding engine 706, the decoding device 712, the decoder engine 716, the video destination device 722, the computing system 900, the processor 910, or a combination thereof.

In some examples, the processes described herein (e.g., the respective processes of FIGS. 1, 2, 5, 6, 7, the process 800 of FIG. 8, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the display 160, the imaging system 200, the pattern engine 205, the display 215, the image sensor 220, the encoding engine 245, the decoding engine 260, the pattern processor 270, the HMD 310, the mobile handset 410, the layer(s) of the display 215 of FIG. 5, the imaging system that performs the operations of FIG. 6, the system 700, the video source 702, the encoding device 704, the encoding engine 706, the decoding device 712, the decoder engine 716, the video destination device 722, the imaging system that performs the process 800, the computing system 900, the processor 910, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
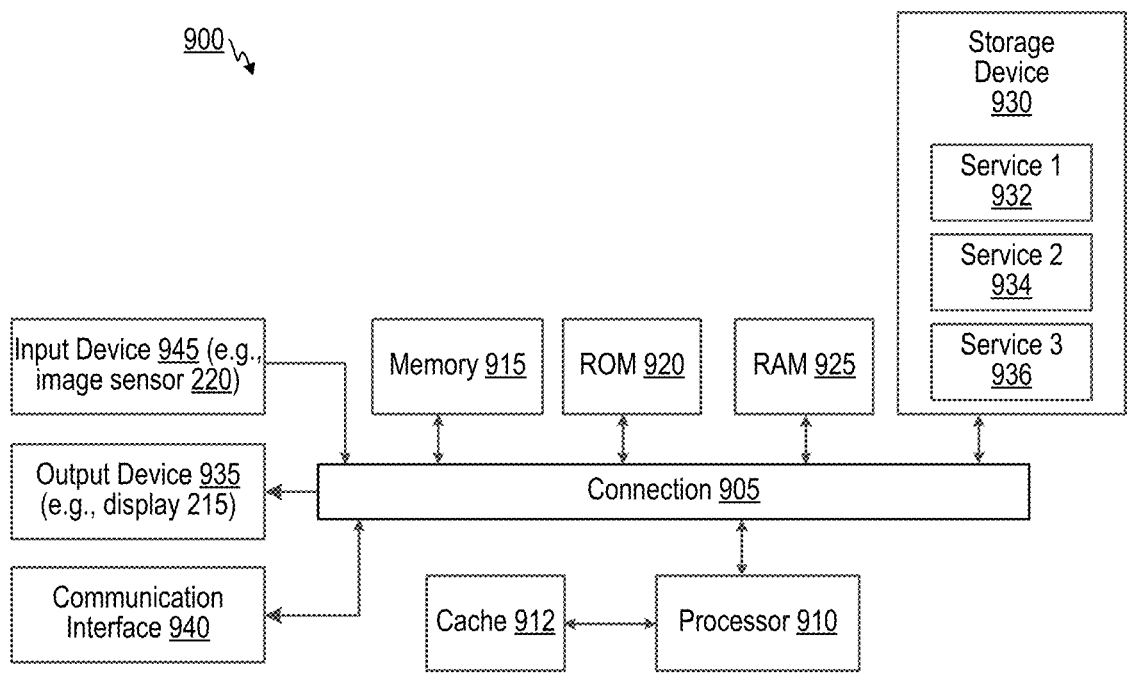
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image-based modeling, the apparatus comprising: at least one memory; and at least one processor coupled to the at least one memory and configured to: a display; an image sensor; at least one memory; and at least one processor coupled to the at least one memory, the at least one processor configured to: cause the display to display light according to a predefined pattern; receive image data of a scene from the image sensor, the image data captured using the image sensor while the display is configured to display the light according to the predefined pattern; detect the predefined pattern within the image data; process, in response to detection of the predefined pattern within the image data, the image data to generate at least one image frame of the scene; and output the at least one image frame of the scene.

Aspect 2. The apparatus of Aspect 1, wherein the camera is fixed relative to the display.

Aspect 3. The apparatus of any of Aspects 1 to 2, further comprising: a housing configured to maintain a relative positioning between the display and the image sensor.

Aspect 4. The apparatus of any of Aspects 1 to 3, wherein the image sensor is configured to receive incident light from the scene after the incident light from the scene passes through at least a portion of the display, wherein the image data is captured using the image sensor based on receipt of at least the incident light from the scene and the light displayed by the display according to the predefined pattern.

Aspect 5. The apparatus of any of Aspects 1 to 4, the at least one processor configured to: encode the image data and an indicator of the predefined pattern to generated encoded image data that includes the indicator of the predefined pattern; and decode the image data based on the indicator of the predefined pattern to process the image data to generate at least one image frame of the scene.

Aspect 6. The apparatus of any of Aspects 1 to 5, the at least one processor configured to: before causing the display to display the light according to the predefined pattern, generate at least a portion of the predefined pattern using a random pattern generator.

Aspect 7. The apparatus of any of Aspects 1 to 6, the at least one processor configured to: before causing the display to display the light according to the predefined pattern, select at least one of a plurality of predefined patterns to determine at least a portion of the predefined pattern.

Aspect 8. The apparatus of any of Aspects 1 to 7, the at least one processor configured to: subtract a detection pattern from the image data to process the image data, wherein the detection pattern is based on the predefined pattern.

Aspect 9. The apparatus of any of Aspect 8, wherein the detection pattern is based on the predefined pattern as detected in the image data.

Aspect 10. The apparatus of any of Aspects 8 to 9, wherein the detection pattern is based on a product of the predefined pattern and a predetermined coefficient.

Aspect 11. The apparatus of any of Aspects 8 to 10, wherein the detection pattern is based on the predefined pattern as adjusted using a predetermined offset.

Aspect 12. The apparatus of any of Aspects 8 to 11, wherein the detection pattern is based on the predefined pattern as scaled according to a scaling factor.

Aspect 13. The apparatus of any of Aspects 8 to 12, wherein the detection pattern is based on the predefined pattern as blurred according to a blurring factor.

Aspect 14. The apparatus of any of Aspects 1 to 13, wherein the predefined pattern includes a spatial pattern that includes at least one spatial variation.

Aspect 15. The apparatus of any of Aspects 1 to 14, wherein the predefined pattern includes a temporal pattern that includes at least one temporal variation.

Aspect 16. The apparatus of any of Aspects 1 to 15, wherein the predefined pattern includes a luminosity pattern that includes at least one luminosity variation.

Aspect 17. The apparatus of any of Aspects 1 to 16, wherein the predefined pattern includes a chromatic pattern that includes at least one chromatic variation.

Aspect 18. The apparatus of any of Aspects 1 to 17, wherein the predefined pattern includes a light intensity pattern that includes at least one light intensity variation.

Aspect 19. The apparatus of any of Aspects 1 to 18, wherein the at least one processor is configured to: output the at least one image frame of the scene for storage in the at least one memory.

Aspect 20. The apparatus of any of Aspects 1 to 19, the at least one processor configured to: detect an object in the at least one image frame of the scene based on an output of a trained machine learning model, wherein the at least one image frame is input into the trained machine learning model.

Aspect 21. The apparatus of any of Aspects 1 to 20, the at least one processor configured to: reduce pixel values in the at least one image frame by correction values associated with the predetermined pattern.

Aspect 22. The apparatus of any of Aspects 1 to 21, wherein the at least one processor is configured to: cause the display to display the at least one image frame of the scene.

Aspect 23. The apparatus of any of Aspects 1 to 22, further comprising: a communication interface configured to transmit the at least one image frame of the scene to a recipient device.

Aspect 24. The apparatus of any of Aspects 1 to 23, wherein the apparatus includes at least one of a head-mounted display (HMD), a mobile handset, or a wireless communication device.

Aspect 25. A method for imaging, the method comprising: causing a display to display light according to a predefined pattern; receiving image data of a scene from an image sensor, the image data captured using the image sensor while the display is configured to display the light according to the predefined pattern; detecting the predefined pattern within the image data; processing, in response to detection of the predefined pattern within the image data, the image data to generate at least one image frame of the scene; and outputting the at least one image frame of the scene.

Aspect 26. The method of Aspect 25, wherein the camera is fixed relative to the display.

Aspect 27. The method of any of Aspects 25 to 26, further comprising: a housing configured to maintain a relative positioning between the display and the image sensor.

Aspect 28. The method of any of Aspects 25 to 27, wherein the image sensor is configured to receive incident light from the scene after the incident light from the scene passes through at least a portion of the display, wherein the image data is captured using the image sensor based on receipt of at least the incident light from the scene and the light displayed by the display according to the predefined pattern.

Aspect 29. The method of any of Aspects 25 to 28, the at least one processor configured to: encode the image data and an indicator of the predefined pattern to generated encoded image data that includes the indicator of the predefined pattern; and decode the image data based on the indicator of the predefined pattern to process the image data to generate at least one image frame of the scene.

Aspect 30. The method of any of Aspects 25 to 29, the at least one processor configured to: before causing the display to display the light according to the predefined pattern, generate at least a portion of the predefined pattern using a random pattern generator.

Aspect 31. The method of any of Aspects 25 to 30, the at least one processor configured to: before causing the display to display the light according to the predefined pattern, select at least one of a plurality of predefined patterns to determine at least a portion of the predefined pattern.

Aspect 32. The method of any of Aspects 25 to 31, the at least one processor configured to: subtract a detection pattern from the image data to process the image data, wherein the detection pattern is based on the predefined pattern.

Aspect 33. The method of any of Aspect 32, wherein the detection pattern is based on the predefined pattern as detected in the image data.

Aspect 34. The method of any of Aspects 32 to 33, wherein the detection pattern is based on a product of the predefined pattern and a predetermined coefficient.

Aspect 35. The method of any of Aspects 32 to 34, wherein the detection pattern is based on the predefined pattern as adjusted using a predetermined offset.

Aspect 36. The method of any of Aspects 32 to 35, wherein the detection pattern is based on the predefined pattern as scaled according to a scaling factor.

Aspect 37. The method of any of Aspects 32 to 36, wherein the detection pattern is based on the predefined pattern as blurred according to a blurring factor.

Aspect 38. The method of any of Aspects 25 to 37, wherein the predefined pattern includes a spatial pattern that includes at least one spatial variation.

Aspect 39. The method of any of Aspects 25 to 38, wherein the predefined pattern includes a temporal pattern that includes at least one temporal variation.

Aspect 40. The method of any of Aspects 25 to 39, wherein the predefined pattern includes a luminosity pattern that includes at least one luminosity variation.

Aspect 41. The method of any of Aspects 25 to 40, wherein the predefined pattern includes a chromatic pattern that includes at least one chromatic variation.

Aspect 42. The method of any of Aspects 25 to 41, wherein the predefined pattern includes a light intensity pattern that includes at least one light intensity variation.

Aspect 43. The method of any of Aspects 25 to 42, wherein the at least one processor is configured to: output the at least one image frame of the scene for storage in the at least one memory.

Aspect 44. The method of any of Aspects 25 to 43, the at least one processor configured to: detect an object in the at least one image frame of the scene based on an output of a trained machine learning model, wherein the at least one image frame is input into the trained machine learning model.

Aspect 45. The method of any of Aspects 25 to 44, the at least one processor configured to: reduce pixel values in the at least one image frame by correction values associated with the predetermined pattern.

Aspect 46. The method of any of Aspects 25 to 45, wherein the at least one processor is configured to: causing the display to display the at least one image frame of the scene.

Aspect 47. The method of any of Aspects 25 to 46, further comprising: causing a communication interface to transmit the at least one image frame of the scene to a recipient device.

Aspect 48. The method of any of Aspects 25 to 47, wherein the method is performed using an apparatus that includes at least one of a head-mounted display (HMD), a mobile handset, or a wireless communication device.

Aspect 49. A non-transitory computer-readable medium having stored thereon instructions that, when executed by one or more processors, cause the one or more processors to perform operations according to any of Aspects 1 to 48.

Aspect 50. An apparatus for image processing, the apparatus comprising one or more means for performing operations according to any of Aspects 1 to 48.

What is claimed is:

1. An apparatus for imaging, the apparatus comprising:
a display;
an image sensor;
at least one memory; and
at least one processor coupled to the at least one memory, the at least one processor configured to:
  cause the display to display light according to a predefined pattern;
  receive image data of a scene from the image sensor, the image data captured using the image sensor while the display is configured to display the light according to the predefined, pattern;
  reduce, in response to a detection of the predefined pattern within the image data, the predefined pattern within the image data to generate at least one image frame of the scene; and
  output the at least one image frame of the scene.

2. The apparatus of claim 1, wherein the image sensor is fixed relative to the display.

3. The apparatus of claim 1, wherein the image sensor is configured to receive incident light from the scene after the incident light from the scene passes through at least a portion of the display, wherein the image data is captured using the image sensor based on receipt of at least the incident light from the scene and the light displayed by the display according to the predefined pattern.

4. The apparatus of claim 1, the at least, one processor further configured to:
encode the image data and an indicator of the predefined pattern to generate encoded image data that includes the indicator of the predefined pattern; and
decode the image data based on the indicator of the predefined pattern to process the image data to generate at least one image frame of the scene.

5. The apparatus of claim 1, the at least one processor further configured to:
before causing the display to display the light according to the predefined pattern, generate at least a portion of the predefined pattern using a random pattern generator.

6. The apparatus of claim 1, the at least one processor further configured to:
before causing the display to display the light according to the predefined pattern, select at least one of a plurality of predefined patterns to determine at least a portion of the predefined pattern.

7. The apparatus of claim 1, the at least one processor further configured to:
subtract a detection pattern from the image data to process the image data, wherein the detection pattern is based on the predefined pattern.

8. The apparatus of claim 7, wherein the detection pattern is based on the predefined pattern as detected in the image data.

9. The apparatus of claim 7, wherein the detection pattern is based on the predefined pattern as adjusted using a predetermined offset.

10. The apparatus of claim 1, wherein the predefined pattern includes a spatial pattern that includes at least one spatial variation.

11. The apparatus of claim 1, wherein the predefined pattern includes a temporal pattern that includes at least one temporal variation.

12. The apparatus of claim 1, wherein the predefined pattern includes a light intensity pattern that includes at least one light intensity variation.

13. The apparatus of claim 1, the at least one processor further configured to:
output the at least one image frame of the scene for storage in the at least one memory.

14. The apparatus of claim 1, the at least one processor further configured to:
detect an object in the at least one image frame of the scene based on an output of a trained machine learning model, wherein the at least one image frame is input into the trained machine learning model.

15. The apparatus of claim 1, the at least, one processor further configured to:
reduce pixel values in the at least one image frame by correction values associated with the predefined pattern.

16. The apparatus of claim 1, the at least one processor further configured to:
cause the display to display the at least one image frame of the scene.

17. The apparatus of claim 1, further comprising:
a communication interface configured to transmit the at least one image frame of the scene to a recipient device.

18. The apparatus of claim 1, wherein the apparatus includes at least one of a head-mounted display (HMD), a mobile handset, or a wireless communication device.

19. A method for imaging, the method comprising:
causing a display to display light according to a predefined pattern;
receiving image data of a scene from an image sensor, the image data captured using the image sensor while the display is configured to display the light according to the predefined pattern;
reducing, in response to a detection of the predefined pattern within the image data, the predefined pattern within the image data to generate at least one image frame of the scene; and
outputting the at least one image frame of the scene.

20. The method of claim 19, wherein the image sensor is fixed relative to the display.

21. The method of claim 19, wherein the image sensor is configured to receive incident light from the scene after the incident light from the scene passes through at least a portion of the display, wherein the image data is captured using the image sensor based on receipt of at least the incident light from the scene and the light displayed by the display according to the predefined pattern.

22. The method of claim 19, further comprising:
encoding the image data and an indicator of the predefined pattern to generate encoded image data that includes the indicator of the predefined pattern; and
decoding the image data based on the indicator of the predefined pattern to process the image data to generate at least one image frame of the scene.

23. The method of claim 19, further comprising:
before causing the display to display the light according to the predefined pattern, generating at least a portion of the predefined, pattern using a random pattern generator.

24. The method of claim 19, further comprising:
before causing the display to display the light according to the predefined pattern, selecting at least one of a plurality of predefined patterns to determine at least a portion of the predefined pattern.

25. The method of claim 19, further comprising:
subtracting a detection pattern from the image data to process the image data, wherein the detection pattern is based on the predefined pattern.

26. The method of claim 19, further comprising:
outputting the at least one image frame of the scene for storage in at least one memory.

27. The method of claim 19, further comprising:
detecting an object in the at least one image frame of the scene based on an output of a trained machine learning model, wherein the at least one image frame is input, into the trained machine learning model.

28. The method of claim 19, further comprising:
reducing pixel values in the at least one image frame by correction values associated with the predefined pattern.

29. The method of claim 19, further comprising:
causing the display to display the at least one image frame of the scene.

30. The method of claim 19, further comprising:
causing a communication interface to transmit the at least one image frame of the scene to a recipient device.

* * * * *